US006307352B1

United States Patent
Hooper

(10) Patent No.: US 6,307,352 B1
(45) Date of Patent: Oct. 23, 2001

(54) HIGH ENERGY CHARGE AND DEPOLARIZATION PULSE CONDITIONER FOR AN ENHANCED-RELIABILITY LEAD-ACID BATTERY CHARGER

(75) Inventor: William P. Hooper, Norcross, GA (US)

(73) Assignee: Enrev Corporation, Norcross, GA (US)

(*) Notice: Subject to any disclaimer, the term of this patent is extended or adjusted under 35 U.S.C. 154(b) by 0 days.

(21) Appl. No.: 09/602,052

(22) Filed: Jun. 23, 2000

Related U.S. Application Data

(60) Provisional application No. 60/160,248, filed on Oct. 19, 1999.

(51) Int. Cl.[7] .......................................... H02J 7/04
(52) U.S. Cl. ............................................... 320/139
(58) Field of Search ................... 320/132, 137, 320/139

(56) References Cited

U.S. PATENT DOCUMENTS

| | | | | |
|---|---|---|---|---|
| 4,912,392 | * | 3/1990 | Faulkner | 320/132 |
| 5,307,000 | | 4/1994 | Podrazhansky et al. | 320/129 |
| 5,442,274 | | 8/1995 | Tamai | 320/146 |
| 5,525,892 | | 6/1996 | Phommarath | 320/139 |
| 5,598,085 | | 1/1997 | Hasler | 320/145 |
| 5,637,980 | | 6/1997 | Wu | 320/128 |
| 5,739,672 | * | 4/1998 | Lane | 320/139 |
| 5,777,453 | | 7/1998 | Imanaga | 320/160 |
| 5,801,515 | * | 9/1998 | Chen et al. | 320/139 |
| 6,016,047 | * | 1/2000 | Notten et al. | 320/137 |

FOREIGN PATENT DOCUMENTS

| | | |
|---|---|---|
| 0847123A1 | 6/1998 | (EP) . |
| 1236145 | 6/1971 | (GB) . |
| PCT/US 00/25285 | 3/2001 | (WO) . |

* cited by examiner

*Primary Examiner*—Peter S. Wong
*Assistant Examiner*—Pia Tibbits
(74) *Attorney, Agent, or Firm*—Troutman Sanders LLP; Charles L. Warner

(57) ABSTRACT

A controller (10) controls the application of charge pulses and discharge (depolarization) pulses to a battery (26) via a charge pulse circuit (22) and a discharge pulse circuit (24). A feedback circuit (18) allows the controller to monitor and adjust the charging process. A wave shaper (12) shapes the waveform of the charge pulses so as to limit the rise time of the charge pulses and thereby reduce reflected voltages and currents. A limiter (14) disables the charging circuit in the event that the controller should specify a charge pulse having an excessive duration or a continuous duration. Another limiter (16) limits the duration of the discharge pulses in the event that the controller should specify a discharge pulse having an excessive duration or a continuous duration. The charge pulse circuit is disabled whenever the controller specifies the application of a discharge pulse, and the discharge circuit is disabled whenever the controller specifies the application of a charge pulse. This prevents the simultaneous application of a charge pulse and a discharge pulse.

19 Claims, 7 Drawing Sheets

HIGH ENERGY CHARGE AND DEPOLARIZATION PULSE CONDITIONER FOR AN ENHANCED-RELIABILITY LEAD-ACID BATTERY CHARGER

CROSS-REFERENCE TO RELATED APPLICATION

This patent application claims the priority of U.S. Patent Application No. 60/160,248, filed Oct. 19, 1999.

TECHNICAL FIELD

The present invention relates to high energy battery chargers and, more particularly, to a pulse waveform condition for preventing damage to the charger or to the battery.

BACKGROUND OF THE INVENTION

High speed battery chargers, which charge a battery at a rapid rate, involve high energies, both for the charging pulses and the depolarization (discharging) pulses. U.S. Pat. Nos. 4,829,225 and 5,307,000 disclose a method and an apparatus for such high speed, high energy battery chargers. However, because of the high energies involved, catastrophic component failure in the charger, catastrophic failure of the battery being charged, and other problems can occur unless critical aspects of both the charge and depolarization waveforms are strictly controlled.

One problem occurs from the combination of the characteristic initial high current consumption and initial high current output of capacitive filters which use large capacitance values, such as the large capacitance values which are commonly present in switched-mode power supplies (SMPS), the inherent inductance of the interconnecting cables between the charger and the battery, and the initial charge acceptance profile of lead-acid batteries. This combination often results in very high magnitude current and voltage transients at the start of each charge pulse applied to the battery. These high magnitude leading edge transients, and their inherently high dv/dt and di/dt characteristics, can cause catastrophic electrical overstress failure of the circuit elements of the charging source, as well as cause high radiated and conducted EMI (electromagnetic interference) emissions. The high energy voltage reflections that propagate along battery cables due to high impulse pulse currents can easily exceed kV and cause immediate or latent failures to key circuit elements.

Induced voltages can be estimated as a function of $E = L\, di/dt$. Assuming a 350 nsec rise and fall times of the SMPS IGBT and an inductance of 206.2 nH per foot (676 nH per meter) for the battery cables, an 85A fundamental current surge will produce a 500 v reflection along a 10 foot (3.05 meter) taped-conductor cable. A 200 A current pulse will produce a 1176 v surge along that same cable. This analysis assumes that the conductors of the battery cable are in tight parallel proximity (taped together). If these same conductors are separated, the inductance is higher, and the reflected surge is higher. For example, if the conductors of the same battery cable are separated by only 12 inches (0.3 meter), the inductance will almost double, so the 85A current pulse will now produce a 910 volt surge along that separated battery cable, and the 200 A current pulse will produce a 2142 volt pulse along that separated battery cable.

Another problem occurs because of the high peak and continuous output charge current capabilities of lead-acid battery chargers. This high current output capability can result in a substantial overcurrent condition. Such an overcurrent condition can be caused by a hardware or software malfunction in the charger, such as in the controlling microprocessor, which malfunction manifests itself by excessive charger duty cycle demands.

Another type of problem occurs due to the depolarization pulse. The depolarization (discharging) circuit is placed directly across the battery terminals. Typically, an insulated gate bipolar transistor (IGBT) is used because of its ability to safely conduct a large current for a short period of time. However, a high capacity battery, such as a lead-acid battery, may be able to supply a large current for a period longer than the IGBT can tolerate. Thus, if a malfunction occurs that results in an excessively long depolarization pulse, or continuous depolarization signal, then the IGBT will overheat and fail. As the depolarization pulse is essential for the rapid, safe charging of batteries, the failure of the depolarization circuit will cause the battery to be improperly charged, and the battery may consequently be damaged or destroyed.

Still another type of problem occurs from the physical installation and location of the battery and of the charger. In order to accommodate the location of the lead-acid battery pack, it is often necessary to employ relatively long charge cables between the charger and the battery pack. These long cables have a substantial inductance and capacitance, and may have a length which is a substantial portion of a wavelength at the frequencies associated with the leading and trailing edge transients of the charge pulse and depolarization pulse waveforms. As a consequence, these long cables may act as a conductor which has a characteristic impedance. If that characteristic impedance is different than the impedance of the terminating load, that is, the battery, and that is almost always the case, then the change in impedance between the cable and the battery will result in a reflected waveform which can result in damaging overcurrents and overvoltages.

A typical battery charger will have a controller and a switching element, and the controller causes the switching element to connect the battery directly to a power source for the duration of a charge pulse. This causes a large current with a rapid rising edge to be applied to the battery. Likewise, when the charge pulse is completed, the controller causes the switching element to abruptly disconnect the battery from the power source. This causes a rapid falling edge. These rapid edges and large currents cause the problems described above.

SUMMARY OF THE INVENTION

The present invention provides for reducing the leading edge transients, and their dv/dt and di/dt characteristics, by limiting the slope of the leading edge of the charging pulse.

The present invention provides for preventing overcurrent conditions caused by failure of the host processor by limiting the charger duty cycle to no more than a predetermined value.

The present invention provides for protecting the depolarization circuit by limiting the duration of a depolarization pulse and preventing a long or continuous depolarization pulse.

The present invention provides for protecting against reflected waveforms by limiting the slopes, both leading and trailing, of the charge pulses and the depolarization pulses, and by absorbing the reflected voltages and currents rather than allowing them to reach the other circuit elements.

The present invention therefore provides for a battery charger which has the advantages and benefits noted above.

DETAILED DESCRIPTION

Figure 1:
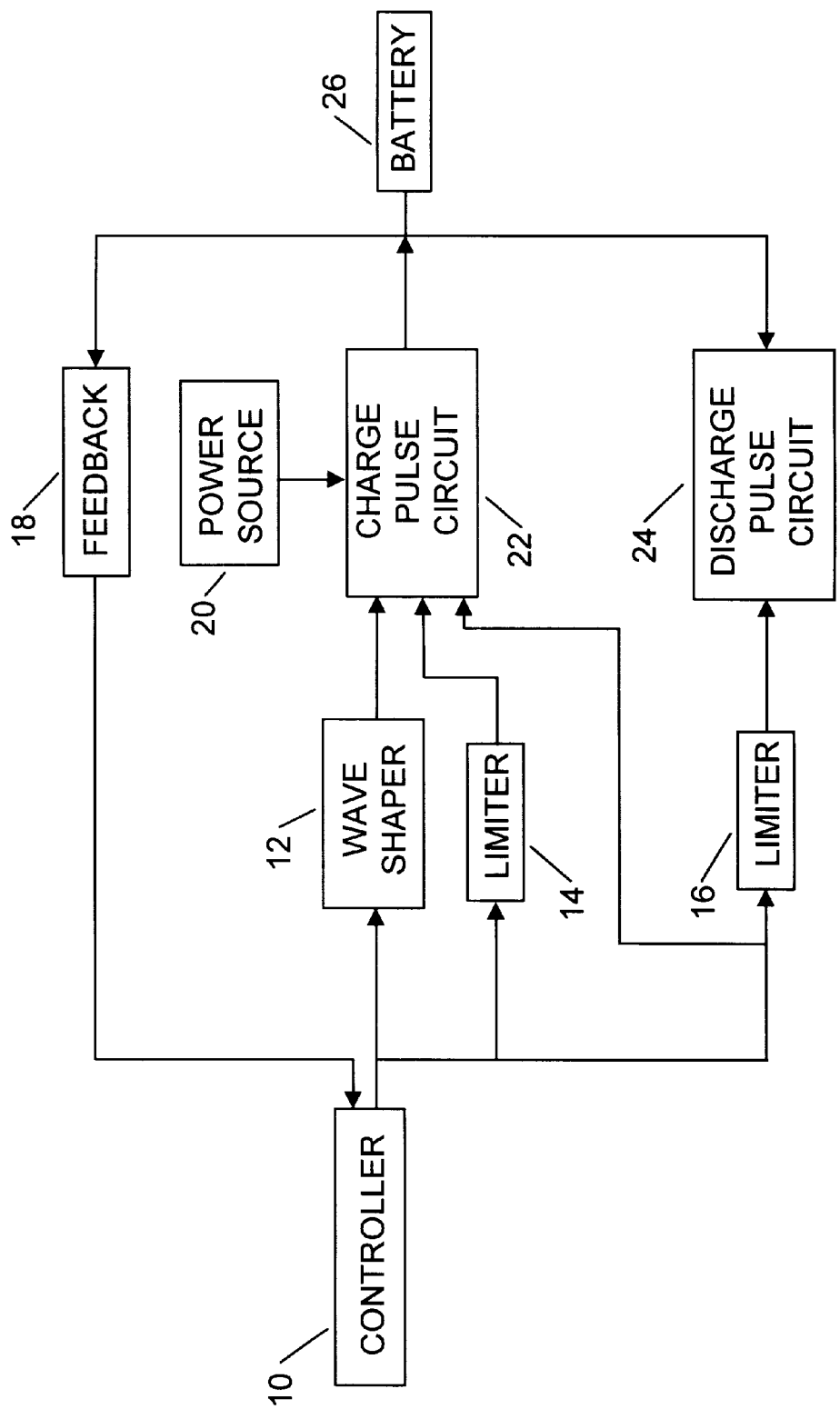
FIG. 1 is a block diagram of the preferred embodiment of the battery charger of the present invention.

FIG. 1 is a block diagram of the preferred embodiment of the present invention. The preferred environment of the present inventions is as a battery charger for lead-acid batteries. The preferred embodiment has a controller 10, a wave shaper 12, limiters 14 and 16, a feedback circuit 18, a power source 20, a charge pulse circuit 22, and a discharge (depolarization) pulse circuit 24.

Figure 3:
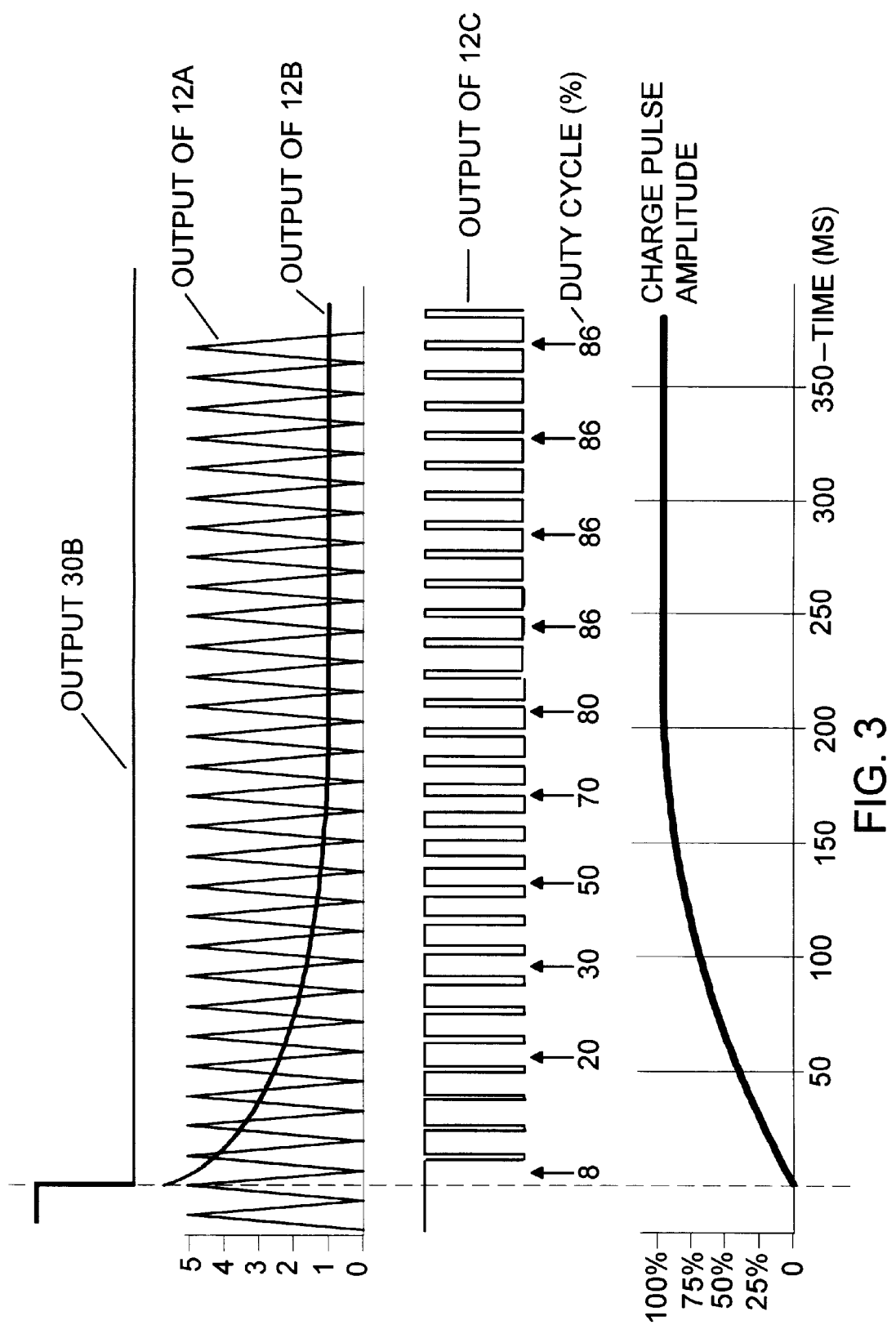
FIG. 3 illustrates the waveforms involved in the present invention.

When a charge pulse is to be applied to the battery, the controller 10 sends a signal to begin applying a charging current to the battery. However, rather than simply turning on the charge pulse circuit 22 to provide the full amplitude charge current for the entire duration of the charge pulse, the wave shaper circuit 12 causes the charge current to gradually build up to the full amplitude, thereby reducing the rise time and the transients and overstress conditions that arise from a rapid rise time. The wave shaper circuit 12 accomplishes this by breaking the charge pulse signal from the controller 10 into a series of pulse width modulated (PWM) charge pulses which gradually increase in duration until a predetermined duration has been reached, at which point the PWM charge pulses remain at that predetermined duration until the controller 10 ends the signal to apply the charge pulse current 22 to the battery. The wave shaper 12 thus produces a conditioned pulse width modulated waveform, as shown in FIG. 3, whose duty cycle is initially a low percentage, and which gradually increases to a target value duty cycle set by the controller 10.

When the charge pulse is completed, the controller 10 ends the signal to apply the charge pulse current 22 to the battery. However, the charge pulse circuit 22 has some, albeit small, storage capacity. Thus, the charge pulse applied to the battery does not end abruptly, but tapers off, thereby reducing the fall time and the transients and overstress conditions that arise from a rapid fall time.

It will be appreciated that the charge delivered to the battery 26 by the gradually increasing charge pulse may be less than the charge delivered to the battery 26 by a full amplitude charge pulse, even if the additional charge provided by the tapering off is considered. Therefore, if the same rate of charge as for a full amplitude prior art charge pulse system is desired, the controller 10 may be programmed to provide a slightly longer charge signal.

The controller 10 sets the initial parameters for a charge cycle, such as the duration of the charge pulse and the maximum charge current, and sends control signals corresponding to these values to the waveshaper 12, and the limiter 14. The wave shaper 12 shapes the waveform of the charge pulse to provide the benefits of the present invention and controls the charge pulse circuit 22, which applies the charge pulses to the battery 26. A power source 20 provides operating power to the charge pulse circuit 22. The limiter 14 is not essential to the present invention, but provides a desirable safety feature: the maximum duration of a charge pulse is limited so that the controller 10 cannot instruct the charge pulse circuit 22 to apply a single, continuous charge pulse or to apply charge pulses having an excessive duration.

The controller 10 also sets the initial parameters for a depolarization (discharge) pulse, such as the duration and the amplitude. The controller 10 sends a discharge pulse signal to the discharge pulse circuit 24 and causes the circuit 24 to deliver a depolarization pulse having the desired duration to the battery 26. As previously mentioned, when a depolarization pulse is being applied a large current is being drawn from the battery 26. Typical depolarization pulse widths and amplitudes are 2 to 5 milliseconds and 80 amps or more. Thus, if there is a failure of the controller 10, or if there are some environmental considerations, or if there is a human error, such as in setting up the programming of the controller 10, or if there is any other situation, which causes these pulses to be extended, such as for a duration of greater than 500 milliseconds, the battery and the discharge circuit could be damaged or destroyed. Limiter 16 limits the duration of the discharge pulse to a predetermined maximum duration, 13 milliseconds in the preferred embodiment. Therefore, in the event of any situation which calls for an extended discharge pulse, the limiter 16 limits the duration of the discharge pulse to a value which prevents damage to the circuit 24 and the battery 26. However, the limiter 16 does not set a minimum duration for the discharge pulses, so discharge pulse signals calling for a discharge pulse duration of less than the predetermined maximum duration will be faithfully reproduced. The limiter 16 thus provides a desirable safety feature.

If the controller 10 should send signals indicating that both charge pulses and discharge pulses should be applied at the same time, or overlapping in time, then major damage to the circuit 22 and 24 could result. Therefore, the output of the controller 10 which specifies that a discharge pulse is to be applied is also provided to the charge pulse circuit 22 and the charge pulse circuit 22 is automatically disabled when a discharge pulse signal is present. Also, the output of the controller 10 which specifies that a charge pulse is to be applied is also provided to the discharge pulse circuit 24 and the discharge pulse circuit 24 is automatically disabled when a charge pulse signal is present. This provides another desirable safety feature.

Feedback circuit 18 provides information to the controller 10 as to the voltage and current levels present at the battery 26. Controller 10 then uses this information, in any of the well-known manners, to adjust the duration, amplitude, frequency, rest periods, etc. of the charging cycle. Thus, the battery charger operates in a closed loop manner.

In the preferred embodiment, the components 12, 14, 16, 18, 22 and 24 are contained in one enclosure. In another embodiment, one or more of these components are contained in the housing which contains the battery 26. In still another embodiment, the controller 10 and one or more of these components 12, 14, 16, 18, 22 and 24 are contained in the housing which contains the battery 26.

In the preferred embodiment, the controller 10 is a microprocessor, and components 12, 14, 16, 18, 22 and 24 are composed of individual discrete components such as transistors, resistors, diodes, etc. In another embodiment, the controller 10 also performs the function of the wave shaper 12. It is also possible for the controller 10 to perform the functions of the limiters 14 and 16 in software. However, in this case there is no backup in the event that the controller 10 fails. Thus, limiters 14 and 16 are preferably not dependent upon the proper operation of the controller 10 for the performance of their functions.

Figure 2:
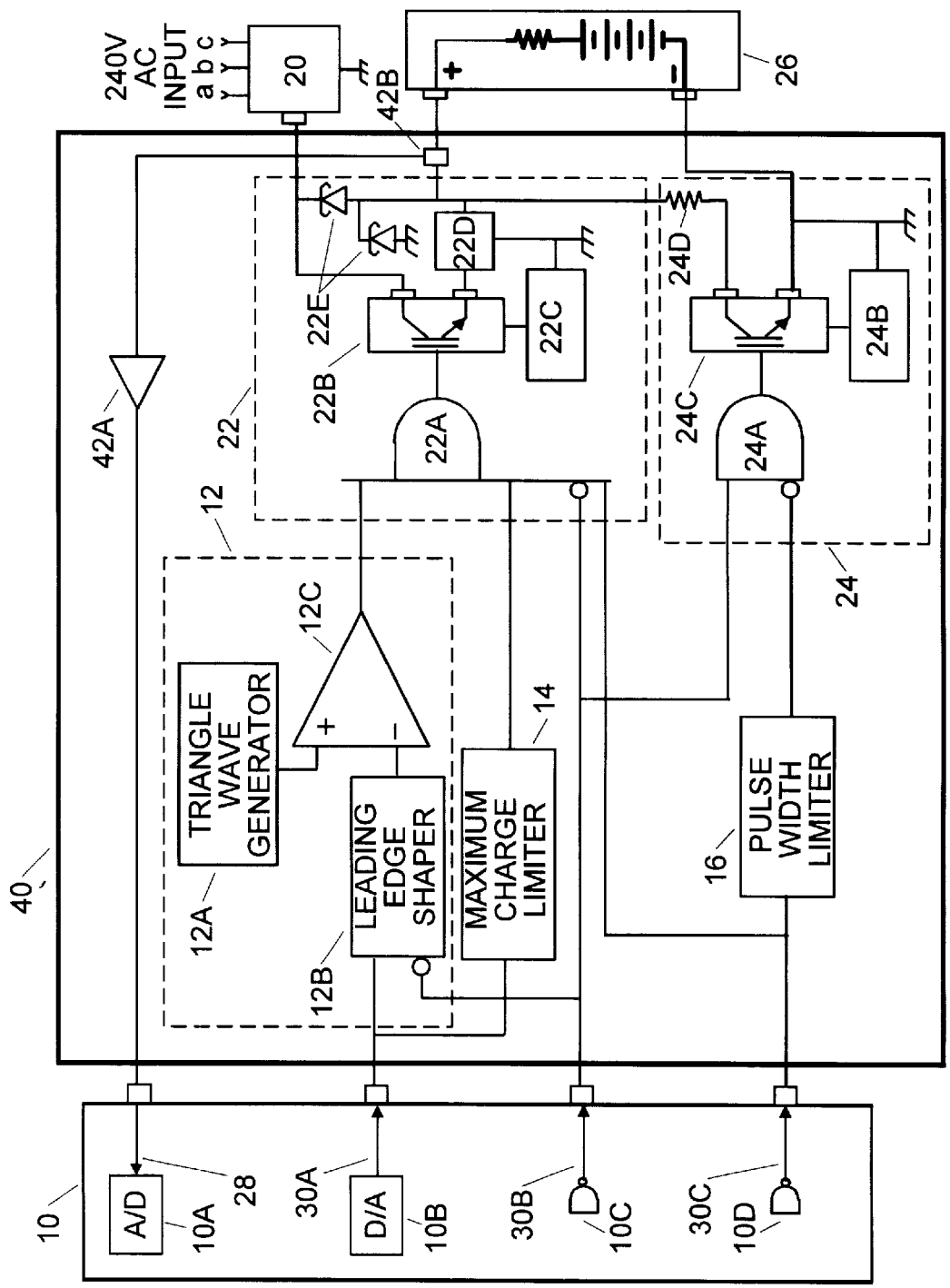
FIG. 2 which is a detailed block diagram of the preferred embodiment of the battery charger of the present invention.

Turn now to FIG. 2 which is a detailed block diagram of the preferred embodiment of the battery charger of the present invention. The battery 26 consists of a plurality of individual cells (not numbered separately) and an inherent internal resistance (not numbered separately). The current flowing into or out of the battery 26 is monitored via module 42B which includes a current monitoring device such as, for example, a Hall effect device. The current signal is then buffered by an isolation amplifier 42A and sent to input 28 of controller 10. Input 28 connected to an analog-to-digital (A/D) converter 10A which converts the signals from analog signals to digital signals for use by the controller 10 in monitoring and adjusting the current during the charging process. If desired, the battery voltage may be similarly monitored.

The controller 10 provides one analog output signal and two digital output signals. Digital-to-Analog converter 10B provides an analog signal on output 30A which indicates the magnitude of the charge pulse to be delivered to the battery 26. Gate 10C provides a digital signal on output 30B which indicates when charge pulses are to be supplied to the battery 26, and therefore controls the duration of the charge pulse applied to the battery. Lastly, gate 10D provides a digital signal on output 30C which indicates when discharge pulses are to be supplied to the battery 26, and therefore controls the duration of the discharge pulse applied to the battery.

Consider now the operation of the limiter 16 and the discharge pulse circuit 24. The discharge pulse circuit 24 includes a gating circuit 24A, an insulated gate bipolar transistor (IGBT) or other semiconductor device 24C, an isolated power supply 24B for transistor 24C, and a depolarization current limiting resistor 24D. When the output of circuit 24A is a logic 1, transistor 24C is turned on, and discharging (depolarization) current is drawn from the battery 26 through the resistor 24D. The magnitude of the depolarization/discharge current is determined by the battery voltage and the value of resistor 24D. When the output of circuit 24A is a logic 0, transistor 24C is turned off. The output of limiter 16 is normally a logic 1, so the output of gate 24A is normally a logic 0, which disables the discharge pulse transistor 24C. In this case, no current is drawn from the battery 26 by the circuit 24. Also, when the output 30B is a logic 0, meaning that a charge pulse is to be applied, the output of gate 24A will be a logic 0, which also disables the discharge pulse transistor 24C. Thus, a discharge pulse cannot be applied when the controller 10 is signaling for a charge pulse to be applied. This is one of the benefits of the present invention as mentioned above.

However, when a discharge pulse is to be applied, output 30C will become a logic 0 and the output 30B will be a logic 1. As long as the duration of the logic 0 on output 30C is less than a predetermined amount, such as 13 milliseconds, then the limiter 16 will pass this logic 0 to the discharge circuit 24, the output of gate 24A will be a logic 1, transistor 24C will be enabled, and discharge current will be drawn from battery 26. However, if the output 30C remains as a logic 0 for greater than the predetermined duration, the output of limiter 16 will revert to a logic 1. This disables the discharge pulse transistor 24C. Thus, a discharge pulse cannot be applied for greater than the predetermined duration. This is one of the benefits of the present invention as mentioned above.

Consider now the operation of the wave shaper 12. The wave shaper 12 has a triangle wave generator 12A, a leading edge shaper 12B, and a comparator 12C. The triangle wave generator 12A generates a triangular waveform of the desired amplitude and frequency, for example, 5 volts peak-to-peak at 20 kHz, and provides this to one input of comparator 12C.

The output 30A of controller 10 is connected to one input of shaper 12B and is, preferably, an analog signal. This analog signal has an amplitude range comparable to that of the triangular waveform, for example, 0 to 5 volts, where, in the preferred embodiment, zero volts indicates a maximum amplitude charge pulse, and 5 volts indicates a zero amplitude charge pulse. The amplitude of the delivered charge pulse is determined by the duty cycle of the output of comparator 12C. The target duty cycle is thus determined by the voltage at output 30A. This analog signal can be provided by D/A converter 10B in the controller 10, as shown, or can be created using a pulse width modulated waveform from the controller followed by a conventional low pass filter.

Output 30B is a negated charge enable signal, that is, a logic 1 indicates that no charge is to be applied, and a logic 0 indicates that a charge is to be applied. When output 30B transitions from a logic 1 to a logic 0, the output of shaper 12B is forced high, thus representing zero charge current, and then is allowed to gradually assume the value specified by the signal from output 30A. Thus, at the transition, the output of shaper 12B will exceed the peak value of the triangular waveform, the output of comparator 12C will be a logic 0, and no charge pulse will be applied. Then, as the output of shaper 12B falls, the output of shaper 12B will be less than the value of the triangular waveform for only a brief instant, such as at the very peak of the triangular waveform. Therefore, the output of comparator 12C will only be a logic 1 for that brief instant, and the charge pulse circuit 22 will provide a small charge current to the battery. As the output of shaper 12B continues to approach the value of output 30A, the output of shaper 12B will be less than the value of the triangular waveform for greater and greater portions of the triangular waveform, so the output of comparator 12C will be a logic 1 for longer and longer periods, and so the charge pulse circuit 22 will provide more and more charge current to the battery. Finally, the output of the shaper 12B will assume the value of output 30A and the output charge current from circuit 22 will have reached its maximum value. Thus, the wave shaper 12 may be viewed as providing a series of pulse-width modulated pulses in response to signals 30A and 30B, with the final pulse width being determined by the value of the signal 30A. The leading edge shaper 12B may also be viewed as a low pass filter for the charge signals 30A and 30B so that the charge current gradually builds to the specified value. Thus, when the output 30B indicates that charging is to take place, the wave shaper 12 causes a charge pulse of gradually increasing amplitude to be applied to the battery. This is one of the benefits of the present invention mentioned above.

In the preferred embodiment, the voltage of output 30B is in the range of approximately 0.5 volts to 4.5 volts, which corresponds to duty cycles of 10% to 90% when a 5 volt supply is used.

The maximum charge limiter circuit 14 monitors the output 30A to prevent a charge pulse having an excessive duration, or a continuous duration, from being applied to the battery in the event of a failure of controller 10 or a short to ground at the output 30A. It will be recalled from the above that a voltage of 5 volts at output 30A means no charge is to be applied to the battery, and lower voltages mean a greater charge is to be applied to the battery. Thus, if output 30A failed at zero volts, or a short to ground occurred, a continuous charge current would be applied to the battery. This could cause overheating and/or catastrophic failure of the charger or the battery. Thus, limiter 14 compares the output 30A with a predetermined value. If the output 30A is less than the predetermined value (approximately ¼ volt in the preferred embodiment), then limiter 14 acts to disable the charge pulse circuit 22 by, in the preferred embodiment, providing a logic 0 to the charge pulse circuit 22. If the output 30A is greater than the predetermined value then limiter 14 provides a logic 1 to the charge pulse circuit 22.

In an alternative embodiment, the charging circuit 22 is not disabled if the output 30A exceeds the predetermined value but the charge is limited to the predetermined value. This can be accomplished by limiting the output pulse width from comparator 12C in the same manner as the output pulse width of the depolarization circuit is limited, as described below. This can also be accomplished by limiting the output 30A to the predetermined value, such as by hard limiting provided by a diode connected to a voltage source of the proper voltage.

Charge pulse circuit 22 consists of a gating circuit 22A, an IGBT transistor 22B, an isolated power supply 22C for transistor 22B, switched mode passive components 22D, and protection diodes 22E. Components 22B–22D form a switched mode power supply which provides the charge pulses to the battery 26. When the output of circuit 22A is a logic 1, transistor 22B is turned on, and charging current is applied to the battery 26. When the output of circuit 22A is a logic 0, transistor 22B is turned off. The output of circuit 22A is enabled when the outputs of comparator 12C, charge limiter 14, and controller output 30C are all a logic 1, and controller output 30B is a logic 0. When any of these outputs are in the opposite state, then the charge pulse circuit 22 is disabled.

When the output of circuit 22A is enabled, then transistor 22B is turned on, thereby allowing power from power supply 20 to be provided to switched mode passive components 22D, and then to the battery 26 so as to provide a charge pulse to the battery. If transistor 22B is only turned on for a short duration, such as when shaper 12B begins to allow charge current to be provided, then only a limited amount of energy will be allowed from power supply 20 to the components 22D and battery 26. If transistor 22B is turned on for a longer duration, such as when shaper 12B has allowed the charge current to rise toward its final value, then a greater amount of energy will be allowed from power supply 20 to the components 22D and battery 26.

Protection diodes 22E are preferably fast recovery epitaxial diodes or Schottkey diodes. If a charge pulse or a depolarization pulse is reflected from the battery as a spike heading toward the charging circuit 22, the diodes 22E will protect the charge circuit 22 and the discharge circuit 24. If a negative-going spike occurs, it will be shorted to ground. If a positive going spike occurs, spike voltages greater than the output voltage of power supply 20 will be directed into the power supply 20, where they will be limited and absorbed so as not to exceed the maximum voltage rating of transistor 22B or any of the other components of circuit 22. All voltage excursions higher than the output voltage of the charger DC power supply 20 (+100 v in this embodiment) will be routed into and absorbed by the bulk capacitor bank (not shown) which is part of power supply 20. Power supply 20 is a conventional AC-to-DC power supply, preferably having a three-phase 240 VAC input, and having a DC output voltage and current rating appropriate for the battery type being charged.

Turn now to FIG. 3, which illustrates the waveforms involved in the present invention. Output 30B is shown as beginning at a logic 1 and then transitioning to a logic 0, thus indicating the beginning of a charge pulse. The triangular waveform output of circuit 12A is shown, along with the output of circuit 12B. It will be noted that the output of circuit 12B begins at a high value, and then decreases to its final value. In the preferred embodiment, this final value is the value of the analog output 30A. The output of comparator 12C is shown and, it will be noted, begins with pulses (logic 0) having a very small duration because the output of circuit 12B is less than the output of circuit 12A for only a short time. As the output of circuit 12B continues to fall, it will be less than the output of circuit 12A for more and more time, so the output of comparator 12C will be a logic 0 for larger and larger pulse widths or durations, until the output of circuit 12B reaches its final value, and the durations of the logic 0 output of comparator 12C will reach their final value. The charge pulse amplitude is also shown, beginning at zero charge, and then gradually increasing, until it reaches its final (100%) value. Thus, rather than the charge pulse amplitude rapidly rising to 100%, and creating the problems mentioned above, the charge pulse amplitude gradually increases to 100%, thus avoiding the problems mentioned above.

Figure 4:
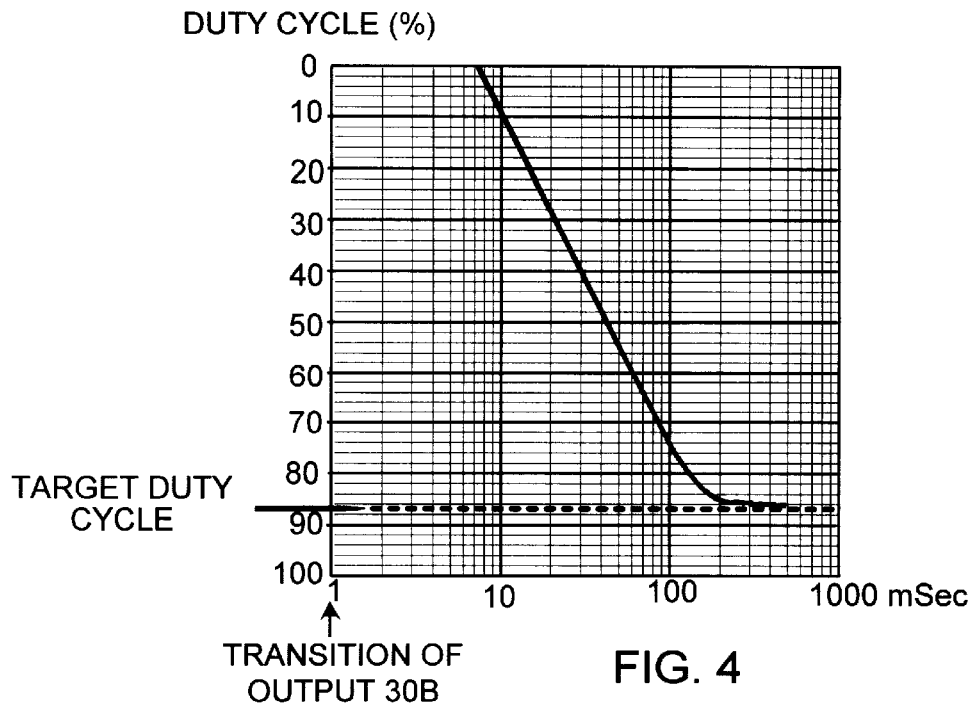
FIG. 4 is an exemplary illustration of the duty cycle variation during a charge pulse.

FIG. 4 is an exemplary illustration of the duty cycle variation during a charge pulse. In this example, output 30A has a value of 1 volt. It is seen that at the beginning, when output 30B transitions to a logic 0, the duty cycle is zero, and then begins increasing so that it is at the target value, about 87%, for a 1 volt output 30A, within about 200 milliseconds.

Figure 5:
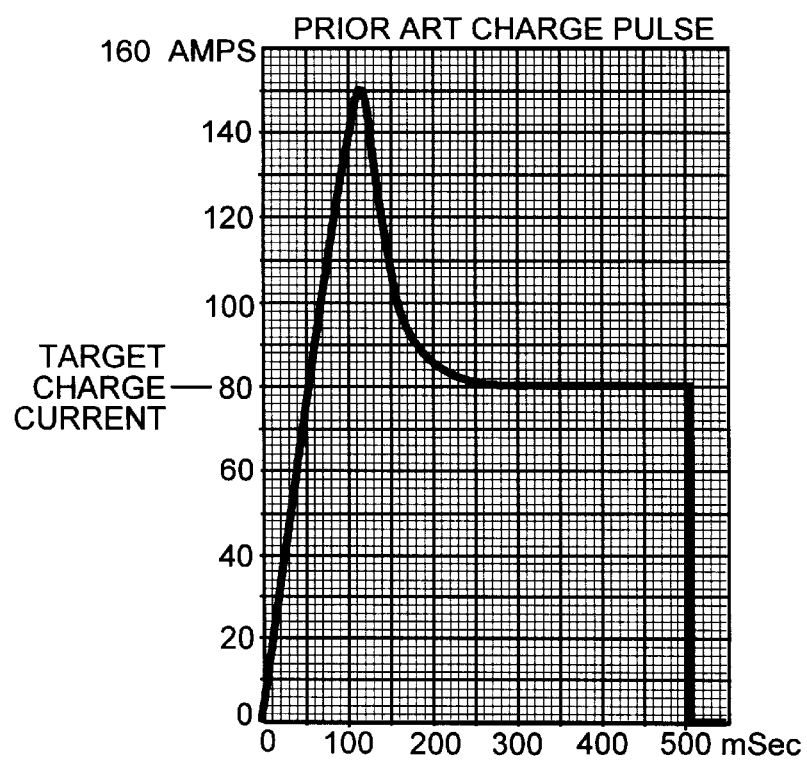
FIG. 5 is an illustration of the charge current pulse waveform for a typical prior art charging system.

FIG. 5 is an illustration of the charge current pulse waveform for a typical prior art charging system. Note the large current spike (150 Amps) at the beginning of the waveform; the peak current is approximately twice the steady state target current (80 Amps). FIG. 5 shows a high current start-up transient during an 80 A charge pulse from a typical prior art battery charger. This current transient can generate very high (greater than 1000 volts) voltage transient spikes, which can cause failure of many voltage-sensitive connected components, such as the IGBT of charge circuit 22 as shown in FIG. 7.

Figure 6:
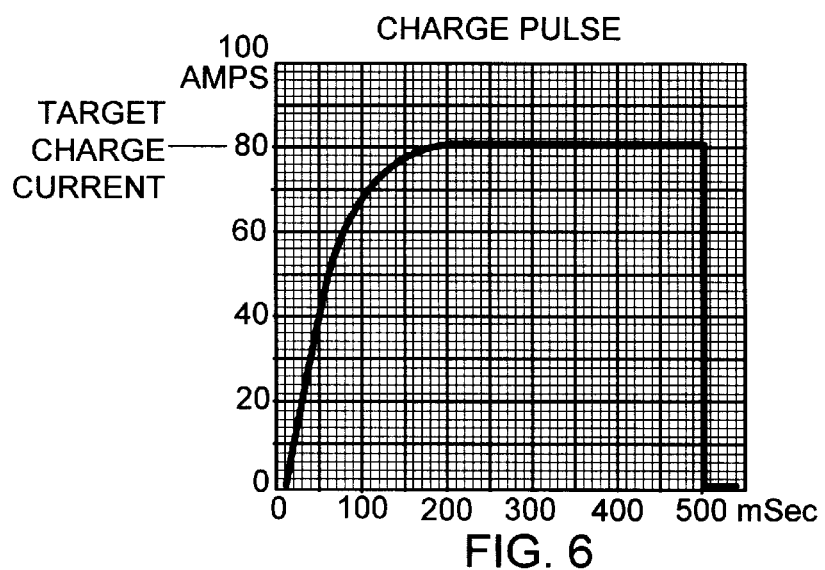
FIG. 6 is an illustration of the charge current pulse waveform provided by the present invention.

FIG. 6 is an illustration of the charge current pulse waveform provided by the present invention. Note the absence of the spike on the leading edge. Also note the gradual rise to the target value (80 Amps). This "soft start" leading edge of the charge current pulse assures lower transient voltages and electrical stress on the components, and also reduces radiated and conducted emissions.

Figure 7:
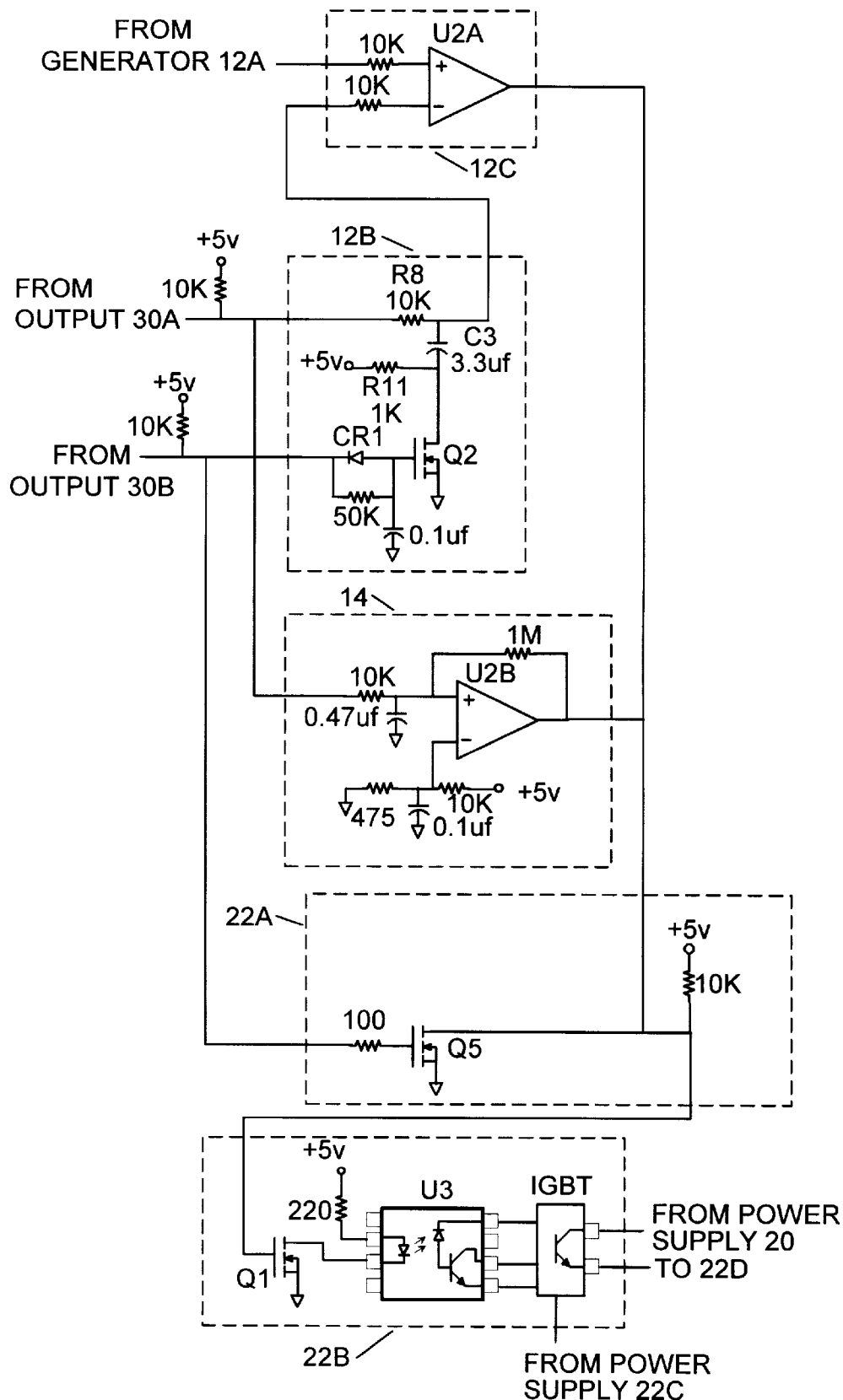
FIG. 7 is a schematic diagram of the wave shaper, the charge pulse limiter, and the charge pulse circuit.

FIG. 7 is a schematic diagram of the wave shaper 12, the limiter 14, and the charge pulse circuit 22 showing in detail the circuits for leading edge shaper 12B, comparator 12C, maximum charge limiter 14, gating circuit 22A, and transistor circuit 22B. The operation of these circuits will, in general, be clear from a review of the diagram. However, a few points may merit explanation.

It will be noted that gating circuit 22A is a "wired-AND" circuit, where the output is a logic 0 if the output of any of the inputs from circuits 12 or 14, or output 30C is a logic 0, or if the output 30B is a logic 1. It will also be noted that a logic 1 at the input of circuit 22B turns on transistor Q1, thereby turning on the light emitting diode and transistor in U3, thereby turning on the IGBT, thereby connecting the power supply 20 to the circuit 22B.

In limiter 14, the reference voltage which sets the maximum duty cycle or pulse width is determined by the 475 ohm and the 10K ohm resistor connected to the negative input of the comparator; the 1 Megohm resistor and the 10K ohm resistor connected to the positive input of the comparator, and provides a degree of hysteresis; and the capacitors provide for noise protection.

In leading edge shaper 12B, when output 30B is a logic 1 (no charging), transistor Q2 is turned on, thereby allowing the 3.3 microfarad capacitor C3 to charge to the input voltage 30A, for example, 3 volts. When output 30B transitions to a logic 0 (charging), transistor Q2 is turned off, thereby allowing the 1K ohm resistor R11 to pull the end of capacitor C3 connected to Q2 up to the supply voltage, for example 5 volts, so the voltage at the end of capacitor C3 connected to the 10K ohm resistor R8 rises to the sum of the input voltage and the supply voltage, 8 volts in this example. This raises the negative input of comparator U2A above the output voltage of the triangle wave generator 12A, so the output of comparator U2A will be zero, meaning a zero pulse width or duty cycle. Capacitor C3 will then discharge through R8 and R11. Eventually, capacitor C3 will discharge to the point that the voltage at the negative input of comparator U2A will be less than the peaks of the voltage output from generator 12A, so a small duty cycle will result. Capacitor C3 will continue discharging in this manner until the voltage at the negative input of comparator U2A is essentially at the voltage of the output 30A. The time constant of resistors R8 and R11 and capacitor C3 is approximately 36 milliseconds, so capacitor C3 will reach its final voltage in approximately 100 milliseconds (three time constants). Note that the end of capacitor C3 connected to resistor R8 will be the negative end of capacitor C3.

When output 30B transitions to a logic 1, meaning that the charge pulse should be ended, transistor Q2 will be turned on again, grounding the end of capacitor C3 connected to Q2. The negative end of capacitor C3 will therefore force the negative input of comparator U2A to a negative value, below the minimum value of the triangular waveform, until it recharges through resistor R8, which would seem to call for a maximum duty cycle. However, as the output 30B is now a logic 1, the gating circuit 22A will disable the charge circuit 22. The time constant of resistor R8 and capacitor C3 is approximately 33 milliseconds, so capacitor C3 will reach its final voltage (approximately 5 volts) in approximately 100 milliseconds (three time constants).

This would seem to indicate that a next charge pulse cannot be applied for 100 milliseconds. However, this is not the case as it is only necessary for capacitor C3 to charge to a value which, when combined with the voltage of output 30A, is greater than or is at least close to the peak value of the triangular waveform so that the initial duty cycles are very narrow and are not the target duty cycles. Also, if desired, circuitry may be provided to enable capacitor C3 to reach its final value more quickly. For example, a diode (not shown) may have its cathode connected to the junction of capacitor C3 and resistor R8, and its anode connected to circuit ground. Thus, when capacitor C3 attempts to drive the junction negative, the diode will quickly discharge the capacitor so that resistor R8 can more quickly charge the capacitor to the voltage of output 30A.

Figure 8:
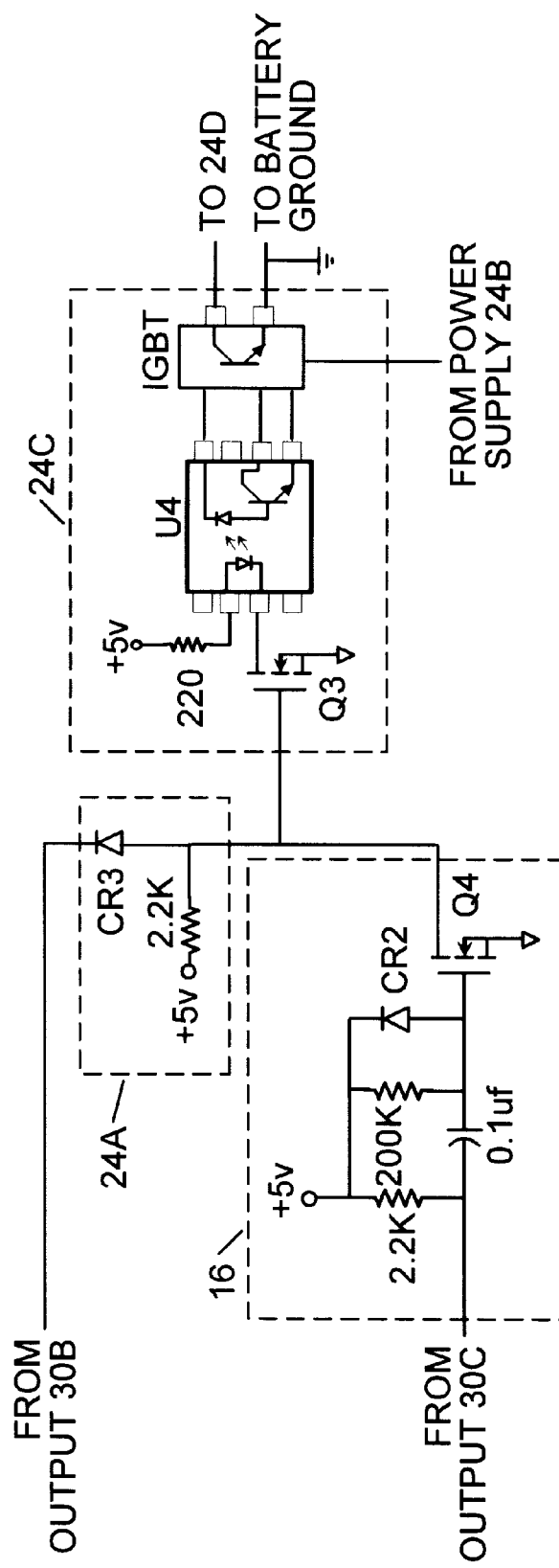
FIG. 8 is a schematic diagram of the depolarization pulse width limiter, the gating circuit, and the depolarization circuit.

FIG. 8 is a schematic diagram of the pulse width limiter 16, the gating circuit 24A, and circuit 24C. The operation of these circuits will, in general, be clear from a review of the diagram. However, a few points may merit explanation.

It will be noted that gating circuit 24A is a "wired-AND" circuit, where the output is a logic 0 if the output 30B is a logic 0 or output from limiter 16 is a logic 1. It will also be noted that a logic 1 at the input of circuit 24C turns on transistor Q3, thereby turning on the light emitting diode and transistor in U4, thereby turning on the IGBT, thereby connecting the discharge resistor 24D to the battery 26.

In pulse width limiter 16, the 200K resistor will normally pull the input of transistor Q4 high, thereby turning on transistor Q4 and turning off transistor Q3. However, if output 30C transitions to a logic 0, it pulls down the input of transistor Q4 via the 0.1 microfarad capacitor, thereby turning it off. If output 30C then transitions to a logic 1 this will also be coupled through the capacitor, thereby turning transistor Q4 on again. However, when the output 30C is a logic 0, the 0.1 microfarad capacitor charges up through the 200K resistor. Thus, the time constant formed by the 200K resistor and the capacitor will set a maximum depolarization pulse width so that, even if output 30C does not transition back to a logic 1 within a predetermined time, the depolarization pulse width will automatically be limited to a safe value. In the preferred embodiment, a pulse width of 13 milliseconds is used although this is not a critical value and other durations, both shorter and longer, could be used depending upon the capacity and nature of the battery being charged and the energy dissipation capability of the discharge circuit 24.

Figure 9:
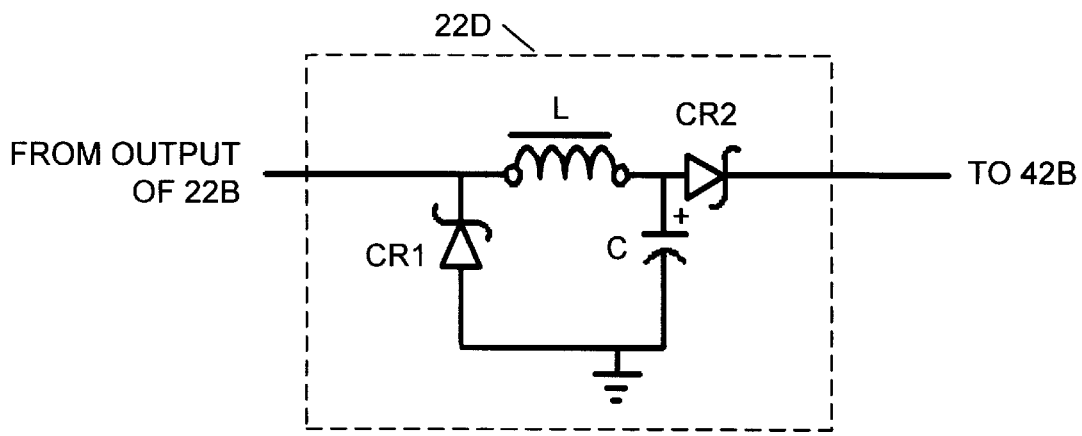
FIG. 9 is a schematic diagram of the passive components of the charging circuit.

FIG. 9 is a schematic diagram of the passive components 22D of the charging circuit 22. The operation of this circuit will, in general, be clear from a review of the diagram. However, a few points may merit further explanation. When circuit 22B is turned on, the power supply 20 is connected to circuit 22D and to the battery 26. The inductor L limits the current that can be initially drawn from the power supply 20 for the capacitor C and the battery 26. Thus, if circuit 22B is on for a very limited period, only a small current will be applied. However, if circuit 22B is on for a longer period, a larger current will be applied. Thus, the charge current applied to the battery can be controlled by varying the pulse width of the signals to the input of circuit 22. In addition, when the circuit 22B is turned off, the inductor L and the diodes CR1, CR2 will provide a flywheel effect which prevents abrupt interruption of the current through inductor L and which provides further charging current, which tapers off as the energy stored in the inductor is discharged into the capacitor C and the battery 26. Thus, rather than the charging current to the battery abruptly ending, the charging current tapers off at a rate determined by the inductor, the capacitor, and the state of charge of the battery. Thus, the trailing edge of the charge pulse is also controlled so as to reduce the reflected voltage and current from the battery. The inductor L and the capacitor C are preferably selected so that a linear current continually flows through the inductor L and the diode CR1 throughout the duty cycle period. For example, for an 80 amp charge pulse, inductor L would have a value of 200 millihenries, and capacitor C would have a value of 10000 microfarads. However, these values are not critical.

Although the trailing edge of the charge pulse of the present thereby falls more slowly than the trailing of a prior art charge pulse due to inductor L, the trailing of the charge pulse of the present invention may still be too rapid for some situations. In this case, the wave shaper 12 could control the wave shape of the trailing edge in the same manner as the wave shape of the leading edge, except that the pulse widths of the output of shaper 12 would begin at the target value and then decrease to zero. Also, the pulse widths of the output of shaper 12 could decrease to some minimum value which provides acceptable results. However, in this case, as the output is desired to continue beyond the low-to-high transition of signal 30B, it will be necessary to provide a time delay before the low-to-high transition of signal 30B disables the charge pulse circuit 22. Care should be taken that the discharge pulse circuit 24 is disabled during this additional time period.

Another method of implementing this longer trailing edge is to adjust the output 30A from the target value to the desired minimum value over the desired period of time. Although the duration of output 30B will have to be extended to accommodate this additional time, this approach has the advantage that the output 30B still provides direct control over the ending of the charge pulse.

In several places, inputs are shown as being connected to +5 volts through a 10K ohm resistor. These are safety resistors, which pull their connected inputs to a non-operative condition in the event that the controller 10 becomes disconnected or fails open.

From the above, it will be appreciated that the present invention provides a battery charger which provides for high speed, high energy battery charging without the adverse effects which accompany typical high speed, high energy battery chargers. It will also be appreciated from a reading of the description above, in conjunction with the accompanying drawings, that the present invention may be implemented in various ways, such as by using digital circuits in place of some analog circuits, and vice-versa.

I claim:

1. A battery charger, comprising:
   a charging circuit connected between a power source and a battery to be charged for providing charge pulses to said battery;
   a pulse shaping circuit connected to said charging circuit for controlling the shape of said charge pulses to reduce transients from said charge pulses.

2. The battery charger of claim 1 and further comprising a controller for controlling at least one of the duration or repetition rate of said charge pulses.

3. The battery charger of claim 2 wherein said controller is connected to said pulse shaping circuit.

4. The battery charger of claim 2 wherein said controller is connected to said charging circuit.

5. A battery charger, comprising:
   a charging circuit connected between a power source and a battery to be charged for providing charge pulses to said battery;
   a pulse shaping circuit connected to said charging circuit for controlling the shape of said charge pulses to reduce transients from said charge pulses wherein said pulse shaping circuit comprises a leading edge shaper for shaping the leading edge of said charge pulses.

6. A battery charger, comprising:
   a charging circuit connected between a power source and a battery to be charged for providing charge pulses to said battery;
   a pulse shaping circuit connected to said charging circuit for controlling the shape of said charge pulses to reduce transients from said charge pulses wherein said pulse shaping circuit comprises a trailing edge shaper for shaping the trailing edge of said charge pulses.

7. The battery charge of claim 6 wherein said trailing edge shaper comprises a flywheel energy storage system.

8. The battery charge of claim 6 wherein said trailing edge shaper comprises a switched mode power supply.

9. A method for charging a battery, comprising the steps of:
   shaping a charge pulse to reduce transients from said charge pulse; and
   providing a plurality of said charge pulse to said battery.

10. A method for charging a battery, comprising the steps of:
    shaping the leading edge of the charge pulse to reduce transients from said charge pulse; and
    providing a plurality of said charge pulse to said battery.

11. A method for charging a battery, comprising the steps of:
    shaping the trailing edge of the charge pulse to reduce transients from said charge pulse; and
    providing a plurality of said charge pulse to said battery.

12. A battery charger, comprising:
    a charging circuit connected between a power source and a battery to be charged for providing charge pulses to said battery;
    a discharging circuit connected to said battery for providing depolarization pulses to said battery by drawing a current from said battery;
    a controller connected to said charging circuit for controlling the application of said charge pulses to said battery, and connected to said discharging circuit for controlling the application of said depolarization pulses to said battery and controlling the duration of said depolarization pulses to be less than a predetermined first duration; and
    a limiter circuit connected to said discharging circuit for limiting the duration of said depolarization pulses to be less than a predetermined second duration, said predetermined second duration being different from said predetermined first duration.

13. The battery charger of claim 12 wherein said limiter circuit is interposed between said controller and said discharging circuit.

14. The battery charger of claim 12 wherein said predetermined second duration is greater than said predetermined first duration.

15. A method for charging a battery, comprising the steps of:
    applying a charge pulse to said battery;
    applying a discharge pulse to said battery, said discharge pulse having a first predetermined duration;
    terminating said discharge pulse in the event said discharge pulse has a duration exceeding a second predetermined duration, said second predetermined duration being different from said first predetermined duration; and
    repeating the above steps.

16. A battery charger, comprising:
    a charging circuit connected between a power source and a battery to be charged for providing charge pulses to said battery;
    a discharging circuit connected to said battery for providing depolarization pulses to said battery by drawing a current from said battery;
    a controller connected to said charging circuit for controlling the application of said charge pulses to said battery, and to said discharging circuit for controlling the application of said depolarization pulses to said battery; and a protection circuit connected to said controller for preventing the simultaneous application of charge pulses and discharge pulses.

17. A method for charging a battery, comprising the steps of:

applying a charge pulse to said battery;

applying a discharge pulse to said battery;

monitoring for a condition indicating that said charge pulse and said discharge pulse should be applied simultaneously to said battery; and if said condition occurs then preventing the simultaneous application of said charge pulse and said discharge pulse to said battery.

18. A battery charger, comprising:

a charging circuit connected between a power source and a battery to be charged for providing charge pulses to said battery;

a discharging circuit connected to said battery for providing depolarization pulses to said battery by drawing a current from said battery;

a controller connected to said charging circuit for controlling the application of said charge pulses to said battery, and to said discharging circuit for controlling the application of said depolarization pulses to said battery; and a protection circuit connected to said controller for preventing the application of charge pulses when said controller is instructing said discharging circuit to apply a discharge pulse.

19. A battery charger, comprising:

a charging circuit connected between a power source and a battery to be charged for providing charge pulses to said battery;

a discharging circuit connected to said battery for providing depolarization pulses to said battery by drawing a current from said battery;

a controller connected to said charging circuit for controlling the application of said charge pulses to said battery, and to said discharging circuit for controlling the application of said depolarization pulses to said battery; and a protection circuit connected to said controller for preventing the application of depolarization pulses when said controller is instructing said charging circuit to apply a charge pulse.

* * * * *